US006158100A

United States Patent [19]

Peterson et al.

[11] Patent Number: 6,158,100

[45] Date of Patent: Dec. 12, 2000

[54] TELEPHONE CABLE SLICE BOX OPENER

[76] Inventors: Erik B. Peterson, 5600 Joe La., Nampa, Id. 83687; Richard D. Peterson, 323 Harlan Pl., Eagle, Id. 83616-4817

[21] Appl. No.: 09/399,590

[22] Filed: Sep. 20, 1999

Related U.S. Application Data

[63] Continuation-in-part of application No. 08/994,690, Dec. 19, 1997.

[51] Int. Cl.[7] ...... B23P 19/04

[52] U.S. Cl. ...... 29/267; 254/25; 29/239; 29/270; 29/278; 29/219

[58] Field of Search ...... 29/267, 269, 270, 29/278, 219, 239; 254/25, 129–131

[56] References Cited

U.S. PATENT DOCUMENTS

| | | | |
|---|---|---|---|
| 1,467,914 | 9/1923 | Balcom | 29/239 |
| 2,325,227 | 7/1943 | Chaddock | 254/25 |
| 3,029,502 | 4/1962 | Middaugh | 29/267 |
| 3,727,490 | 4/1973 | Diffenderfer et al. | 29/239 |
| 3,963,153 | 6/1976 | Bly | 222/541 |
| 4,991,893 | 2/1991 | Gordon et al. | 254/129 |
| 5,090,102 | 2/1992 | Lovell | 29/255 |
| 5,339,977 | 8/1994 | Schormair | 220/284 |
| 5,570,607 | 11/1996 | Yoshizawa | 74/110 |
| 5,603,487 | 2/1997 | Couillard | 254/27 |

*Primary Examiner*—David A. Scherbel
*Assistant Examiner*—Lee Wilson
*Attorney, Agent, or Firm*—Stephen M. Nipper; Frank J. Dykas; Robert L. Shaver

[57] ABSTRACT

A tool for opening a sealed telephone cable splice box. The tool has a fulcrum adapted to bear against various points on the ends of the splice box. The tool also has a lever adapted to cooperate with the fulcrum and a sliding member that slides longitudinally along the lever and is adapted to bear against the box top. The top of the box is separated from the bottom and ends of the splice box by transferring force between sliding member and the fulcrum through the lever.

2 Claims, 4 Drawing Sheets

TELEPHONE CABLE SLICE BOX OPENER

This is an application claims priority of, and is a CIP of co-pending U.S. application Ser. No. 08/994,690, filed Dec. 19, 1997.

BACKGROUND OF THE INVENTION

1. Field of the Invention

This invention is generally directed toward a tool and method for forcefully opening a sealed compartment, more specifically, this invention relates to tools for opening telephone cable splice boxes or cases.

2. Description of the Prior Art

A telephone cable splice box is comprised of four major parts. A top, a bottom, and two ends. The four parts are interfitted together using seals. The current design of telephone cable splice boxes provide for opening the box by breaking its seals by the following means:

a. Inserting bolts into threaded holes in the flange of the top half of the box;

b. Driving the bolts downward against metal plates located on the flange of the bottom half of the box; and, c. As the top half travels up the bolts, the halves separate.

The problem to which the invention is directed to is that the current means for opening telephone splice boxes allows the bottom half to separate from the ends. Since the box is suspended off of the ground by the cables running through the ends, the mass of wires inside of the box drop down with the bottom half which makes working on the wires more difficult. This also causes reassembly of the box to take much longer because the worker must reconnect any wires which came disconnected when the wires dropped out of the box, and the worker must repack the wires into the box. What is needed is a tool which allows the splice box to be opened without resulting in the separation of the bottom half of the box from the ends of the box.

SUMMARY OF THE INVENTION

This invention is able to solve this problem by the following means. The invented tool is able to separate the top of the box from the bottom and ends by means of applying force downward through the ends to the bottom and against the top. Because of the resistance between the top and bottom halves to separate, the downward pressure of the ends tends to compress the seal between the ends and the bottom. Because the ends are pushing down against the bottom, the only opposing force is between the top and bottom halves.

The preferred embodiment of the present invention comprises a lever having two fulcrum means, one at each end of the lever. The first fulcrum is shaped to reach into the recessed ends and applies force against various points on the ends or cable. The second fulcrum is formed to a tapered flat shape, such as a screwdriver or pry bar, and is able to be placed at various points where clearances are at a minimum. This tapered end can also be used as a pry bar to further separate the top and bottom after the initial breaking of the seal. This is done by means of inserting the tapered end between the flanges of the top and bottom halves.

A sliding member is provided on the lever to allow a means of adjusting the distance between either of the fulcrums and the point at which force is applied to the top of the box. The sliding member is indexed to the lever by means of an opening in its cross section that matches the cross section of the lever. The sliding member has sides shaped to match the shape of the underside of the lip of the top half of the box. Such an arrangement allows the sliding member to be retained under the lip of the top half of the box, making it captive while force is being applied. This results in safety for the operator and minimizes damage to the splice box.

The tool is symmetrical along the longitudinal axis, that is to say, having the same features on both sides of the tool, allowing it to be used at either end of the box or either side of the box.

After the top half of the box is separated from the ends and bottom of the box, the ends remain sealed to the bottom. The wires do not fall out of the box, but instead remain in place making repair work easy. Reassembly of the box is quick because only the top half needs to be resealed and mounted.

BRIEF DESCRIPTION OF THE DRAWINGS

The invention will now be described in detail having reference to the accompanying drawings in which.

DESCRIPTION OF THE PREFERRED EMBODIMENT

Figure 1:
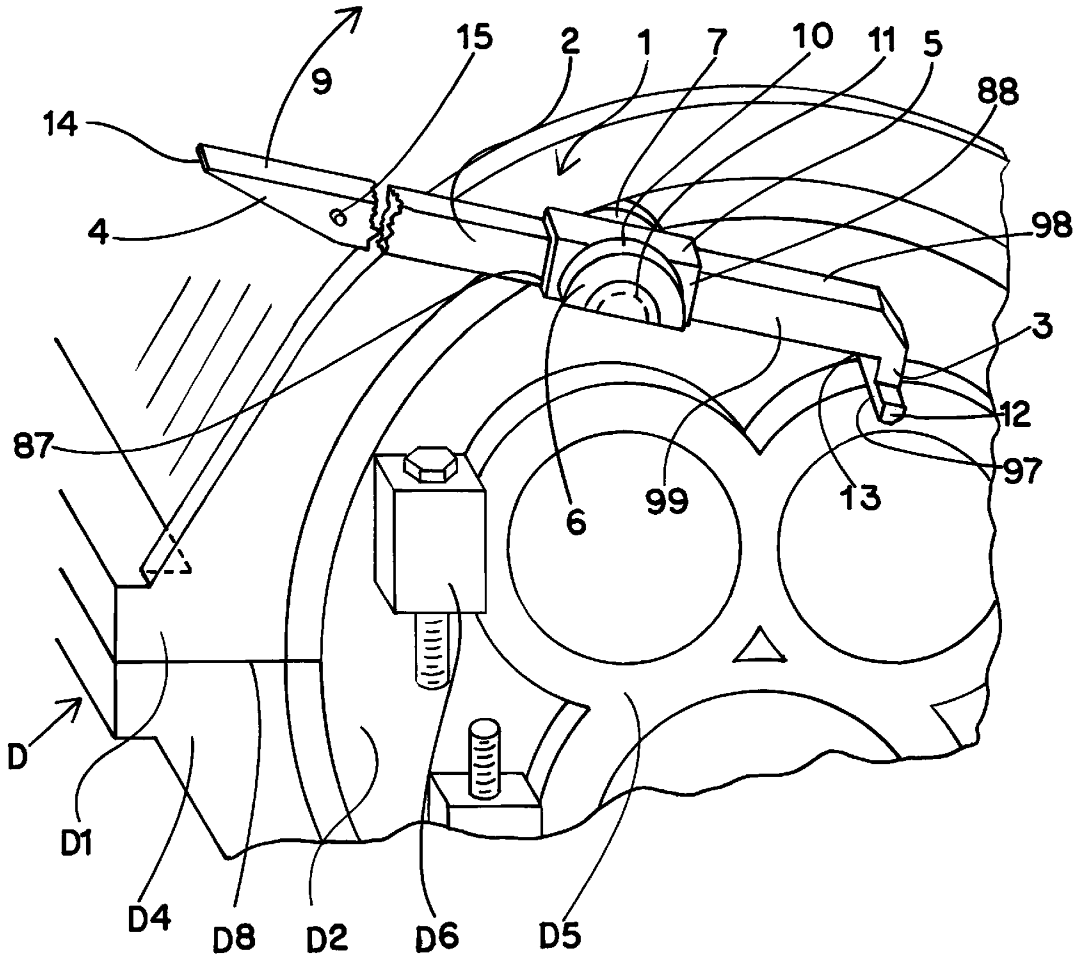
FIG. 1 is a perspective view, in partial section, of the tool in use.

The present invention is a tool for opening telephone cable splice boxes. The preferred embodiment 1 of the present invention is shown in the Figures. FIG. 1 shows the tool 1 being used to open a telephone cable splice box (D).

The tool 1 comprises an elongated bar portion 2 and a sliding means portion 5. The bar 2 generally serves as a lever and the first end 3 and second end 4 of the bar 2 are alternatingly able to serve as fulcrums. The bar 2 is longitudinally symmetrical along its vertical center line. The ends 3, 4 further comprise fulcrum means 12, 13, 14 for placement on various locations on the box end D2.

Figure 4:
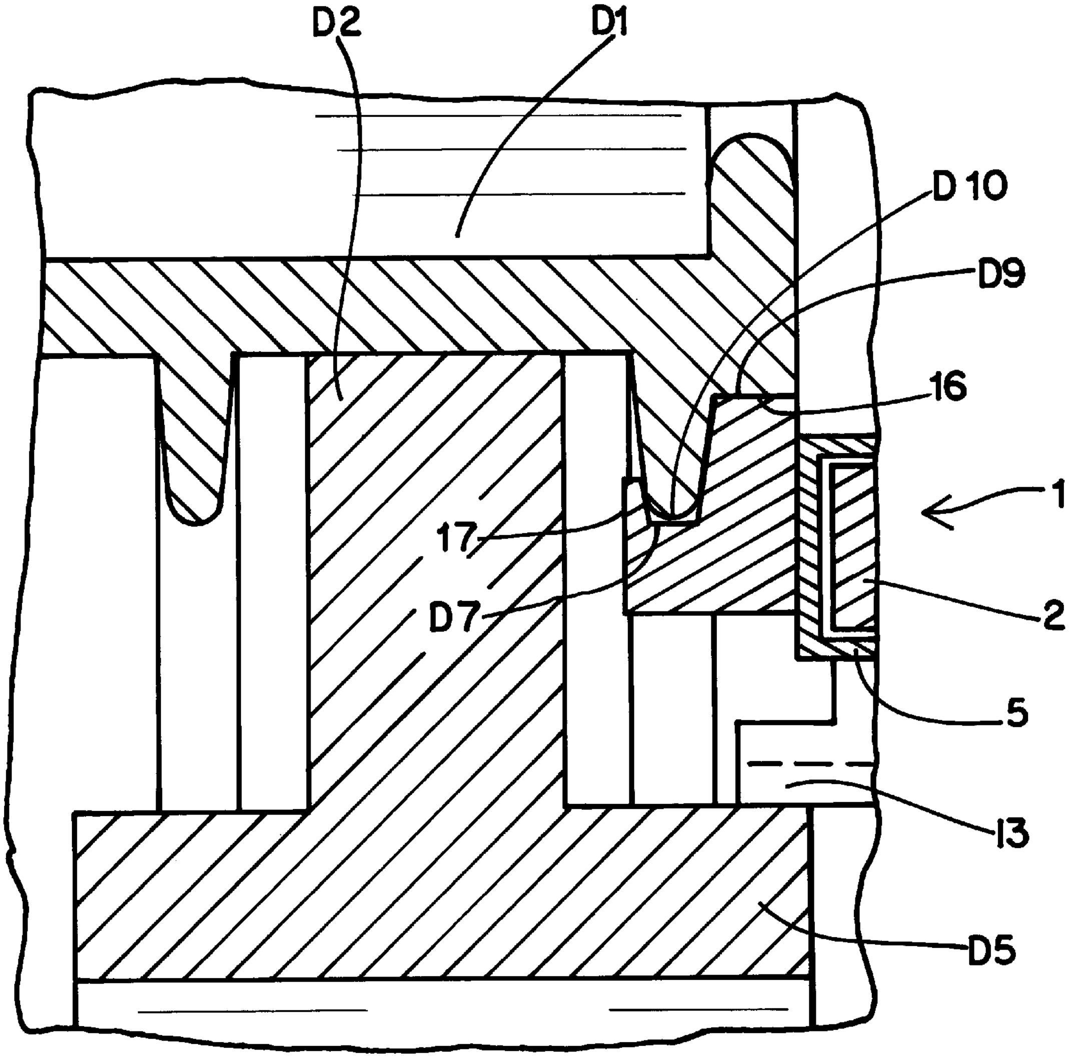
FIG. 4 is a larger scale sectional detail in the vicinity where the tool contacts the top of the box as depicted in FIG. 3.

The sliding member 5 is indexed to the bar 2 and is able to slide along the length of the bar 2. The sliding member 5 has side portions 6, 7 which extend outwards from each side of the sliding member 5 for cooperation with the box top D1, particularly the outer rim 77, as shown in FIG. 4. The side portions 6, 7 thus further prevent the tool 1 from slipping out from under the leading edge 77 of box top D1. A retainer pin 15 is provided on the second end 4 to retain the sliding member 5 on the lever 2.

In the preferred embodiment, the tool 1 has a longitudinal axis having a first end 3 opposite a second end 4, and a first side 98 opposite a second side 99. The first end 4 is tapered towards the lever first side 99. The second end 3 curves generally towards the lever second side 98 and has a flange 97 located perpendicular to the longitudinal axis of the lever 2.

The second end 3 provides fulcrum means by means of flange extensions 12, 13 for connection with the recessed box end D2. The second end 3 is so shaped so as to allow placement of these flanges 12, 13 on various protruding points on box end D2, i.e., the cable boss D5, the clamping boss D6 or the cable itself (not shown). It is against these protruding points which the tool 1 is leveraged.

The first end 4 may be tapered to a thin horizontal edge and provides placement at points where clearance is at a minimum. The first end 4 also can be used as a pry bar to finish separating box top D1 from the box end D2 and box bottom D4 after the initial breaking of the seals.

Figure 3:
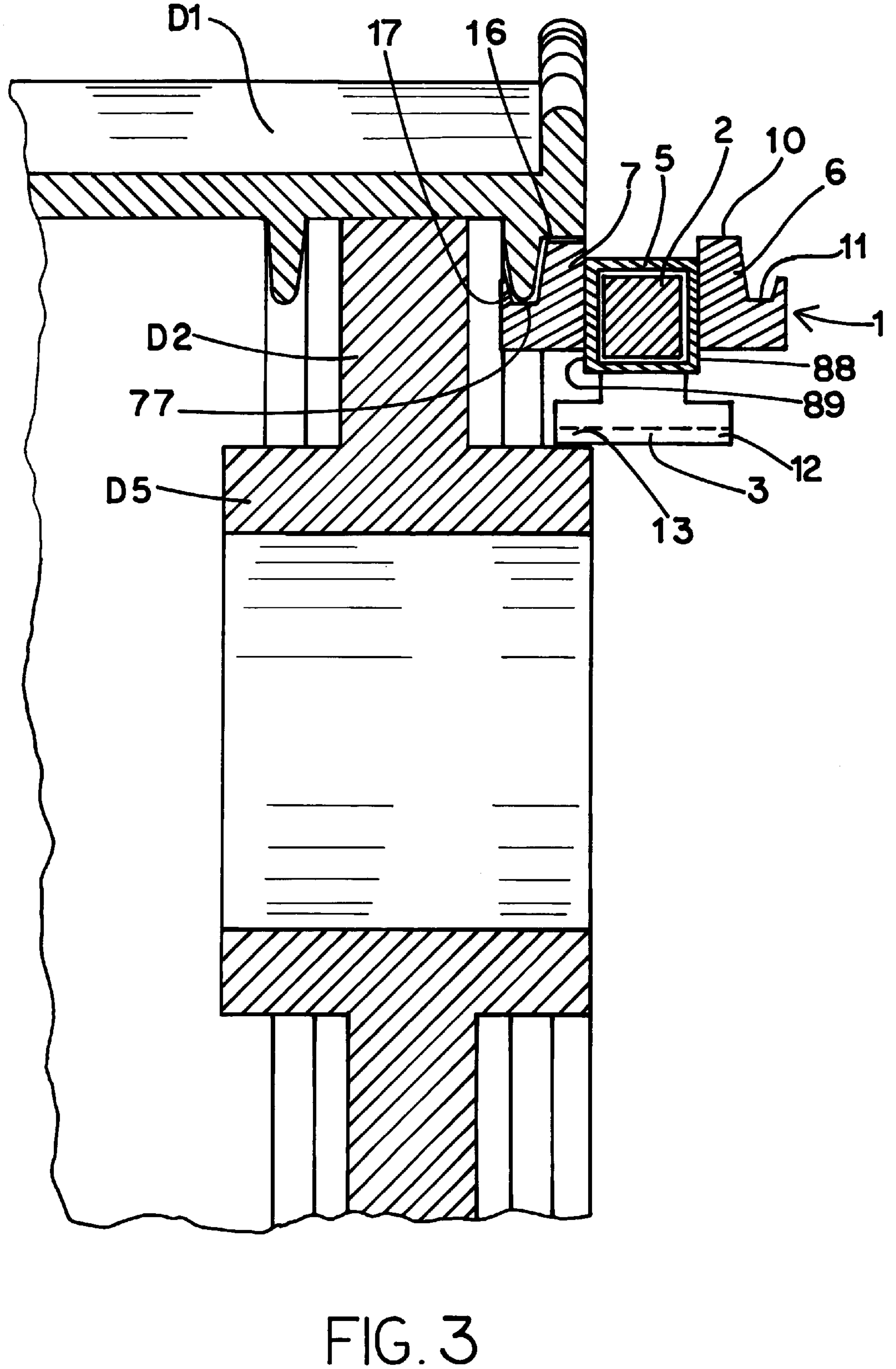
FIG. 3 is a cross-section view of the tool in use taken along line 3—3 in FIG. 2.

Because box end D2 may provide for different cable configurations and be mounted in difference orientations to box top D1, adjustments are necessary as to how far apart the sliding member sides 6, 7 are distanced from the ends 3, 4 of the lever 2. To this end, sliding member 5 is able to slide longitudinally along the lever 2. As shown in FIG. 3, this enables surfaces, or lips, 10, 11 or 16, 17 to contact various points under the leading edge 77 of box top D1 along surfaces D9, D10, as shown in FIG. 4, by providing proper spacing from surfaces D9, D10 to various points on box end D2 such as D5, D6.

The sliding member 5 has a first side 88 opposite a second side 89 and an aperture 87 extending through it which is parallel to the sliding member first and second sides 88, 89. The lever 2 is able to be inserted through this aperture 87 and the sliding member 5 is thus slidable along the longitudinal axis of the lever 2.

It is preferred that the sides 88, 89 further comprise at least one semi-circular lip 10, 11 extending outwards from the sliding member first side 88, and preferably the sliding member second side 89 as well (16, 17). This lip (10, 11) curves parallel to the sliding member's side 88 and towards the lever's first side 98. These lips are for cooperating with the box top member, particularly the box top rim 77 where the box top rim 77 is received between the lip (10, 11, 16, 17) and the side of the sliding member (88, 89).

The sides of sliding member 5 are of such design as to allow for two separate functions. First, surfaces 10 or 16 make contact with surface D9 on the box top where the force is applied upward. Second, in addition to applying upward force, surface 11 or 17 become captive to surface D10 on the box top D1, when upward force is applied, preventing tool 1 from slipping out sideways from under the leading edge of box top D1. This is particularly the case where the box (D) is formed of a rubber-like material and the tool 1 is formed of a rigid material such as aluminum or plastic.

Because the centerline of the force is to one side of main bar 2, the edge 77 slides along the sliding member 5 as the lever is moved upwards 9, thereby rotating the member 5 out from under the leading edge 77 of box top D1. To this end, provision has been made by indexing sliding member 5 to main bar 2 by means of using any matching shape other than round in their cross-sections.

Figure 2:
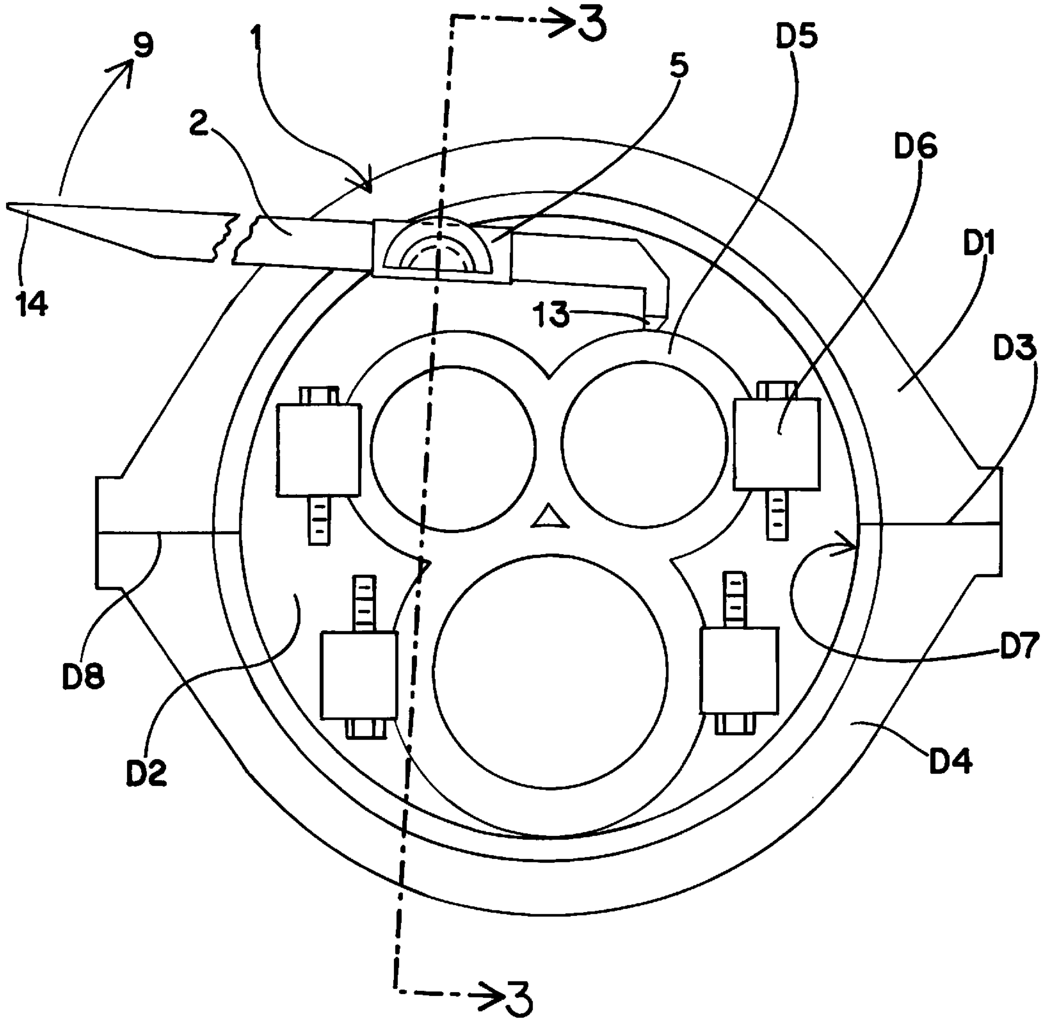
FIG. 2 is an end view, of a telephone cable splice box, with the tool in partial section, in use.

In use, the tool 1 is used to pry open a sealed box or casing. The tool is particularly adapted to pry open a telephone cable splice box. FIG. 2 shows the sealed seams D3, D7, D8 as seen from the end of the box. The tool is placed so that the side of the main bar 2, is against the end of the box top D1, with one of the fulcrum means (12 (not shown), 13, 14) placed on a bearing point on box end D2 such as D5, D6 or at any other convenient point. Sliding member 5 is then slid along main bar 2 until it contacts the underside of the leading edge 77 of box top D1, as shown in FIG. 3. The free end of tool 1 is then rotated upward as shown by arrow 9 so that surfaces 10, 11 or 16, 17 on tool 1 mate with surfaces D9, D10 on box top D1 as shown in FIGS. 3 and 4.

In preferred use, first the second end 3 is placed in contact with the box end member D2, at a location such as D5 or D6, and one of the lips (10, 11, 16, 17) cooperate with the box top member D1. Then, when force is applied to the first end 4 of the lever 2 in a direction towards the first side 98 of the lever, the second end 3 of the lever 2 is used as a fulcrum against the box end member D2 and the box top member D1 is moved away from the box end member D2, thereby separating the box end member D2 from the box top member D1.

Because of the resistance of the seals D3, D8 between the box top D1 and the box bottom D4, as depicted in FIG. 2, the downward pressure on box end D2, also depicted in FIG. 4, compresses seal D7 where it contacts box end D2 and box bottom D4, thereby causing the box end D2 to remain affixed to box bottom D4. This action leaves only one opposing force. The opposing force is between box top D1 and box end D2. This results in the breaking of the seal between box top D1 and the top half of box end D2. The box top D1 now can be removed while leaving the box bottom D4 connected to the box ends D2.

We claim:

1. A tool for opening a telephone cable splice box having a box top member, a box bottom member, and at least one box end member, said tool further comprising:

an elongated lever with a longitudinal axis having a first end opposite a second end, and a lever first side opposite a lever second side, said first end tapered towards said lever first side, and said second end curving generally towards said lever second side, said second end further comprising a flange perpendicular to the longitudinal axis of the lever;

a sliding member having a sliding member first side opposite a sliding member second side, and an aperture extending through said sliding member parallel to said sliding member first and second sides for insertion of said lever through said aperture, said sliding member means slidable along the longitudinal axis of said lever, said sliding member having at least one semi-circular lip extending outwards from said sliding member first side, said lip for cooperating with said box top member; and, wherein said lever second end is placed in contact with said box end member and said lip cooperates with said box top member so that when force is applied to the first end of the lever in the direction towards the first side of the lever, the second end of the lever is used as a fulcrum against the box end member and the box top member is moved away from the box end member, thereby separating the box end member from the box top member.

2. A tool for opening a telephone cable splice box having a box top member, a box bottom member, and at least one box end member, said tool further comprising:

an elongated lever having a first end opposite a second end, and a lever first side opposite a lever second side, said second end curving generally towards said lever second side, said second end farther comprising a flange perpendicular to the length of the lever;

a sliding member having a member first side opposite a member second side, and an aperture extending through said sliding member parallel to said member first and second sides, said lever extending through said aperture, said sliding member slidable along the length of said lever, said sliding member for cooperating with said box top member, wherein a box top member rim is received between said sliding member and said member side;

wherein said sliding member farther comprises a semi-circular lip extending outwards from said member first side, the curvature of said lip curving parallel the member first side and towards the lever's first side, said lip for cooperating with said box top member; and, wherein said lever second end is placed in contact with said box end member and said sliding member cooperates with said box top member so that when force is applied to the first end of the lever in the direction towards the first side of the lever, the second end of the lever is used as a fulcrum against the box end member and the box top member is moved away from the box end member, thereby separating the box end member from the box top member.

* * * * *